US012568198B2

(12) United States Patent
He et al.

(10) Patent No.: US 12,568,198 B2
(45) Date of Patent: Mar. 3, 2026

(54) 3D DISPLAY METHOD AND 3D DISPLAY DEVICE

(71) Applicant: GUANGDONG FUTURE TECHNOLOGY CO., LTD., Shenzhen (CN)

(72) Inventors: Shu He, Shenzhen (CN); Wanliang Xu, Shenzhen (CN)

(73) Assignee: GUANGDONG FUTURE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/938,370

(22) Filed: Nov. 6, 2024

(65) Prior Publication Data

US 2025/0133199 A1     Apr. 24, 2025

Related U.S. Application Data

(63) Continuation of application No. PCT/CN2022/143110, filed on Dec. 29, 2022.

(30) Foreign Application Priority Data

May 7, 2022     (CN) .......................... 202210494259.0

(51) Int. Cl.
 *H04N 13/383*     (2018.01)
 *H04N 13/275*     (2018.01)
 *H04N 13/302*     (2018.01)
(52) U.S. Cl.
 CPC ......... *H04N 13/383* (2018.05); *H04N 13/275* (2018.05); *H04N 13/302* (2018.05)

(58) Field of Classification Search
 CPC .......................... H04N 13/383; H04N 13/302
 See application file for complete search history.

(56) References Cited

U.S. PATENT DOCUMENTS

| | | | | |
|---|---|---|---|---|
| 7,467,356 B2 * | 12/2008 | Gettman | ................ | G06Q 30/02 |
| | | | | 715/850 |
| 8,643,569 B2 * | 2/2014 | Vesely | ................... | H04N 13/30 |
| | | | | 345/184 |
| 9,013,474 B2 * | 4/2015 | Park | ....................... | G09G 3/003 |
| | | | | 455/414.3 |
| 9,224,238 B2 * | 12/2015 | Weill | .................... | G06T 15/205 |

(Continued)

FOREIGN PATENT DOCUMENTS

| | | |
|---|---|---|
| CN | 107341004 A | 11/2017 |
| CN | 108600733 A | 9/2018 |

(Continued)

*Primary Examiner* — Irfan Habib
(74) *Attorney, Agent, or Firm* — IPRO, PLLC; Na Xu

(57) ABSTRACT

Disclosed are a 3D display method and related devices. The 3D display method includes: in a condition that a display image corresponding to a current layer is to be rendered to a screen of a 3D display device, determining whether the current layer is marked to be in a 3D display mode; in a condition that the current layer is marked to be in the 3D display mode, obtaining physical parameters of the 3D display device; invoking an interleaving program to interleave the display image corresponding to the current layer according to the physical parameters of the 3D display device to obtain a 3D display image corresponding to the current layer; and rendering and displaying the 3D display image.

6 Claims, 5 Drawing Sheets

(56) References Cited

U.S. PATENT DOCUMENTS

| | | | | |
|---|---|---|---|---|
| 9,721,045 B2 * | 8/2017 | Arrighi | ............... | G06F 3/04815 |
| 9,886,102 B2 * | 2/2018 | Hosenpud | .......... | G06F 3/04815 |
| 10,019,831 B2 * | 7/2018 | Champion | ............ | G06T 19/006 |
| 10,019,849 B2 * | 7/2018 | Berman | ............... | H04N 13/368 |
| 11,694,302 B2 * | 7/2023 | Murdison | ............... | G06F 3/013 |
| | | | | 345/428 |
| 2003/0197737 A1 * | 10/2003 | Kim | ..................... | G06F 16/954 |
| | | | | 715/781 |
| 2007/0083383 A1 * | 4/2007 | Van Bael | ............... | G06F 30/00 |
| | | | | 715/772 |
| 2010/0156781 A1 * | 6/2010 | Fahn | ..................... | H04N 7/144 |
| | | | | 345/156 |
| 2010/0169837 A1 * | 7/2010 | Hyndman | .......... | G06F 16/9566 |
| | | | | 715/848 |
| 2011/0161843 A1 * | 6/2011 | Bennett | ............... | H04N 21/235 |
| | | | | 715/760 |
| 2012/0036226 A1 * | 2/2012 | Chor | ........................ | G06K 1/12 |
| | | | | 709/219 |
| 2012/0162214 A1 * | 6/2012 | Chavez | .............. | G06F 3/04815 |
| | | | | 345/419 |
| 2012/0249443 A1 * | 10/2012 | Anderson | ............ | A63F 13/213 |
| | | | | 345/173 |
| 2012/0249531 A1 * | 10/2012 | Jonsson | ................. | G06F 3/011 |
| | | | | 345/419 |
| 2012/0275765 A1 * | 11/2012 | Ikeda | ................... | H04N 13/128 |
| | | | | 386/E5.028 |
| 2013/0083021 A1 * | 4/2013 | Cohen | .................... | G06T 17/00 |
| | | | | 345/420 |
| 2013/0104018 A1 * | 4/2013 | Shefi | .................... | G06F 40/134 |
| | | | | 715/205 |
| 2013/0141434 A1 * | 6/2013 | Sugden | ............. | G02B 27/0172 |
| | | | | 345/426 |
| 2013/0328870 A1 * | 12/2013 | Grenfell | ................. | G06T 15/04 |
| | | | | 345/582 |
| 2014/0122579 A1 * | 5/2014 | Friefeld | ................. | H04L 67/06 |
| | | | | 709/203 |
| 2014/0168232 A1 * | 6/2014 | Hart | ....................... | G09G 5/397 |
| | | | | 345/520 |
| 2014/0184589 A1 * | 7/2014 | Vesely | ................... | G06F 3/012 |
| | | | | 345/419 |
| 2014/0240312 A1 * | 8/2014 | Vesely | ................... | G06F 3/013 |
| | | | | 345/419 |
| 2014/0267637 A1 * | 9/2014 | Hoberman | ........... | G06F 1/1632 |
| | | | | 348/53 |
| 2014/0278920 A1 * | 9/2014 | Holden | ............. | G06Q 30/0245 |
| | | | | 705/14.44 |
| 2014/0285485 A1 * | 9/2014 | Jian | ..................... | H04N 13/156 |
| | | | | 345/419 |
| 2015/0035821 A1 * | 2/2015 | Andriotis | ............. | G06F 40/143 |
| | | | | 345/419 |
| 2015/0036174 A1 * | 2/2015 | Pettis | ................... | G06F 3/1288 |
| | | | | 358/1.15 |
| 2015/0082180 A1 * | 3/2015 | Ames | ................. | G06F 3/04815 |
| | | | | 715/849 |
| 2015/0082181 A1 * | 3/2015 | Ames | ................. | G06F 3/04815 |
| | | | | 715/738 |
| 2015/0091906 A1 * | 4/2015 | Dishno | ............. | G06F 16/9577 |
| | | | | 345/427 |
| 2015/0331575 A1 * | 11/2015 | Fernandez-Ruiz | ..... | G06T 19/20 |
| | | | | 715/850 |
| 2016/0154457 A1 * | 6/2016 | Osaragi | .............. | G06F 3/04815 |
| | | | | 345/179 |
| 2017/0024112 A1 * | 1/2017 | McKegney | ........ | G06F 3/04847 |
| 2017/0061700 A1 * | 3/2017 | Urbach | ............... | G02B 27/017 |
| 2017/0161448 A1 * | 6/2017 | Fram | ..................... | A61B 90/36 |
| 2017/0161937 A1 * | 6/2017 | Dideriksen | ........ | G06F 3/04842 |
| 2018/0144541 A1 * | 5/2018 | Champion | ........... | H04N 13/106 |

FOREIGN PATENT DOCUMENTS

| | | |
|---|---|---|
| CN | 109922326 A | 6/2019 |
| CN | 112714302 A | 4/2021 |
| CN | 113347410 A | 9/2021 |
| CN | 113411574 A | 9/2021 |
| CN | 114928739 A | 8/2022 |
| EP | 2384010 A2 | 11/2011 |

* cited by examiner

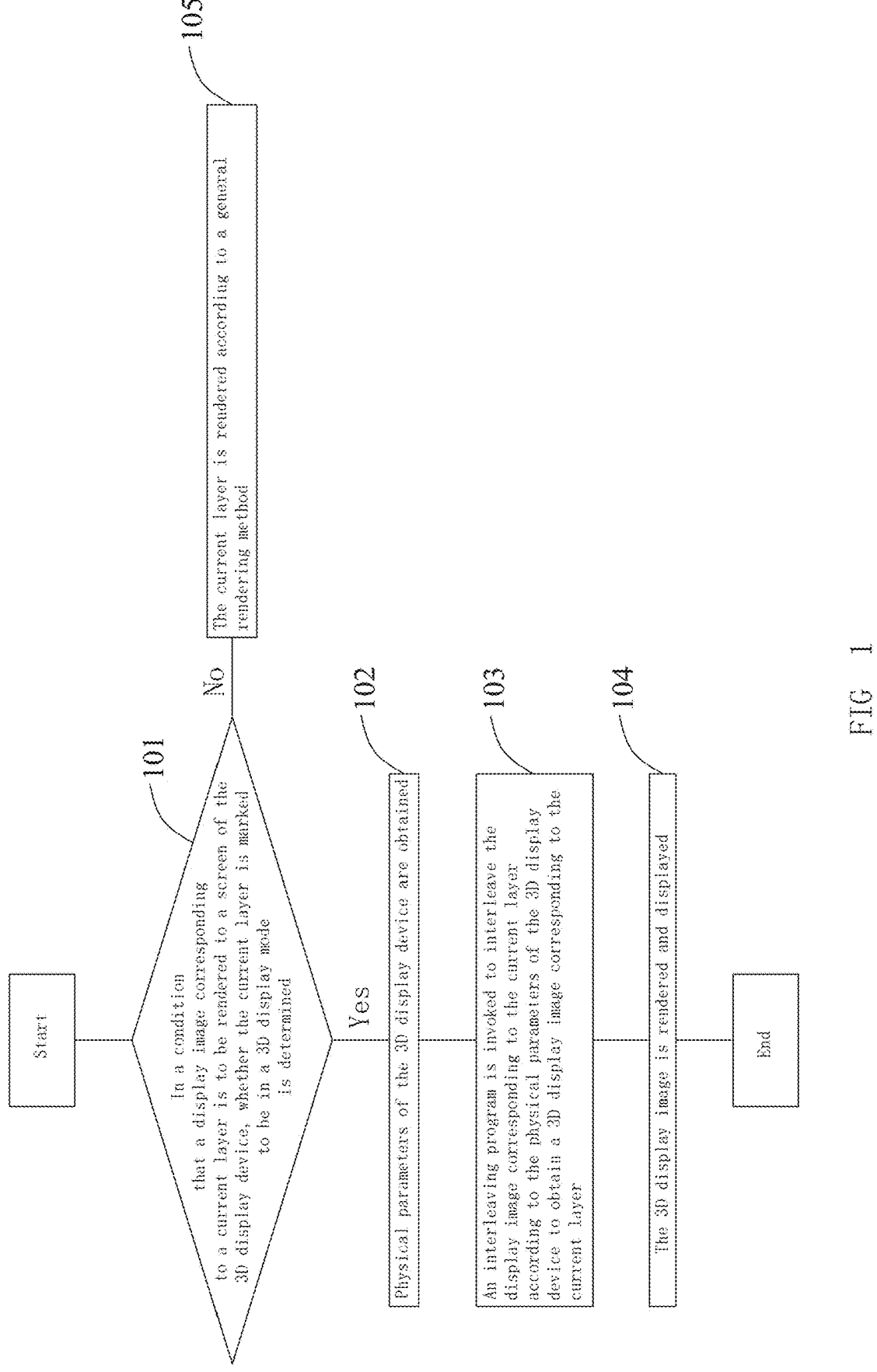

The current layer is rendered according to a general rendering method

No

101

In a condition that a display image corresponding to a current layer is to be rendered to a screen of the 3D display device, whether the current layer is marked to be in a 3D display mode is determined Start Yes

102

Physical parameters of the 3D display device are obtained

103

An interleaving program is invoked to interleave the display image corresponding to the current layer according to the physical parameters of the 3D display device to obtain a 3D display image corresponding to the current layer

104

The 3D display image is rendered and displayed

End

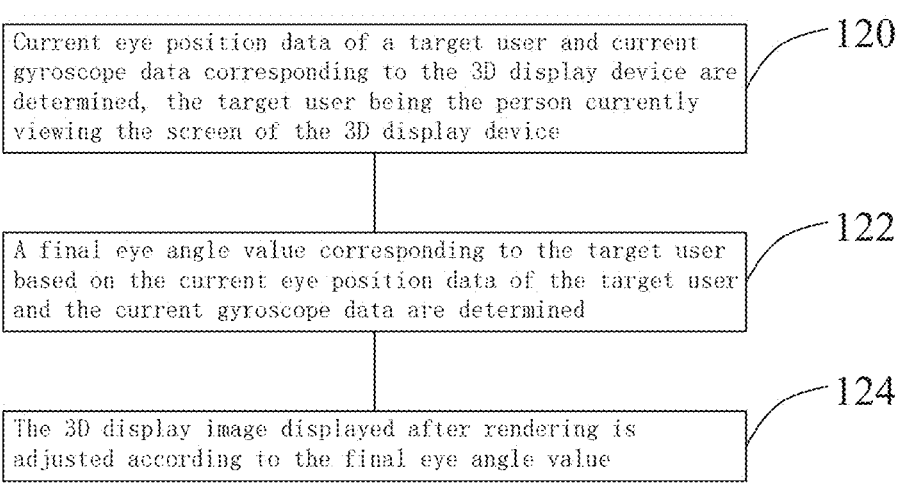

Current eye position data of a target user and current gyroscope data corresponding to the 3D display device are determined, the target user being the person currently viewing the screen of the 3D display device — 120

A final eye angle value corresponding to the target user based on the current eye position data of the target user and the current gyroscope data are determined — 122

The 3D display image displayed after rendering is adjusted according to the final eye angle value — 124

FIG 3

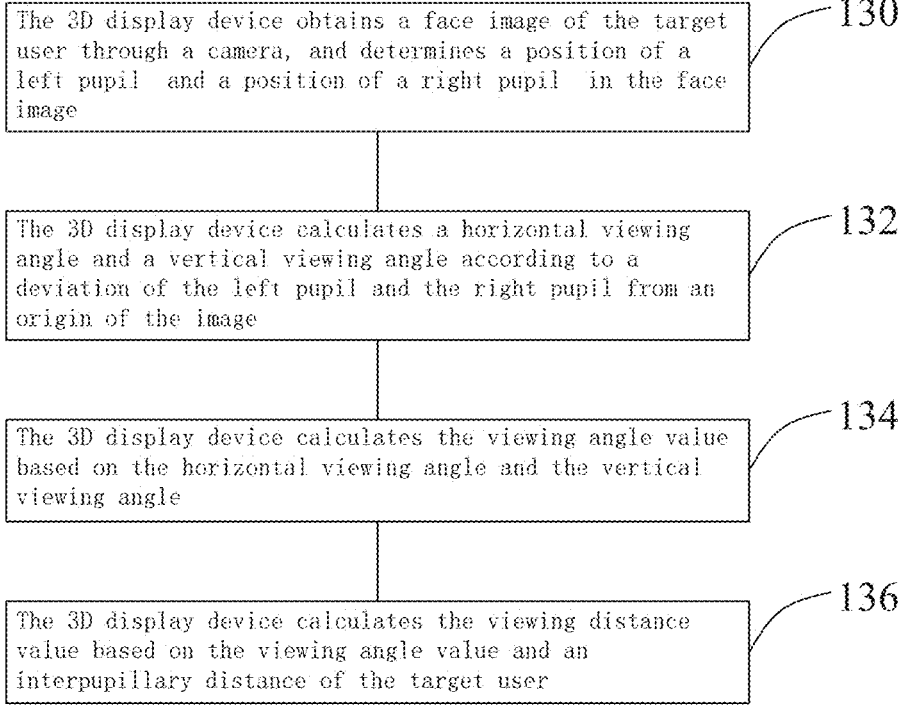

The 3D display device obtains a face image of the target user through a camera, and determines a position of a left pupil and a position of a right pupil in the face image — 130

The 3D display device calculates a horizontal viewing angle and a vertical viewing angle according to a deviation of the left pupil and the right pupil from an origin of the image — 132

The 3D display device calculates the viewing angle value based on the horizontal viewing angle and the vertical viewing angle — 134

The 3D display device calculates the viewing distance value based on the viewing angle value and an interpupillary distance of the target user — 136

FIG 4

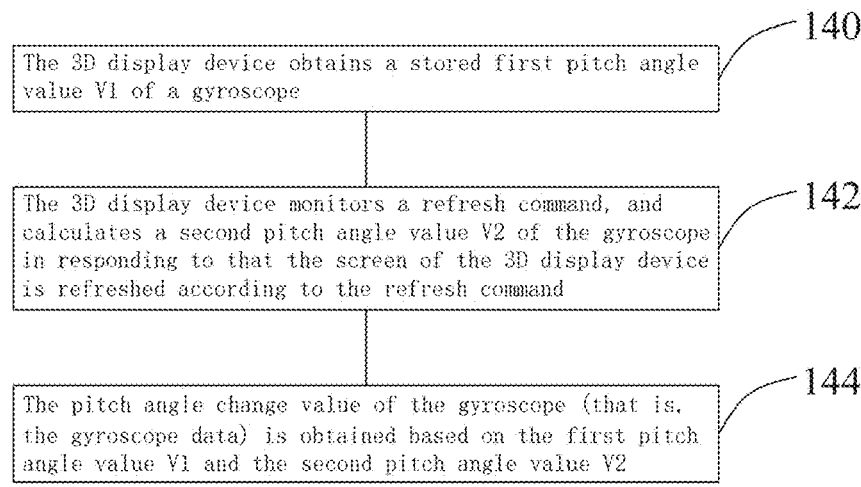

The 3D display device obtains a stored first pitch angle value V1 of a gyroscope — 140

The 3D display device monitors a refresh command, and calculates a second pitch angle value V2 of the gyroscope in responding to that the screen of the 3D display device is refreshed according to the refresh command — 142

The pitch angle change value of the gyroscope (that is, the gyroscope data) is obtained based on the first pitch angle value V1 and the second pitch angle value V2 — 144

FIG  5

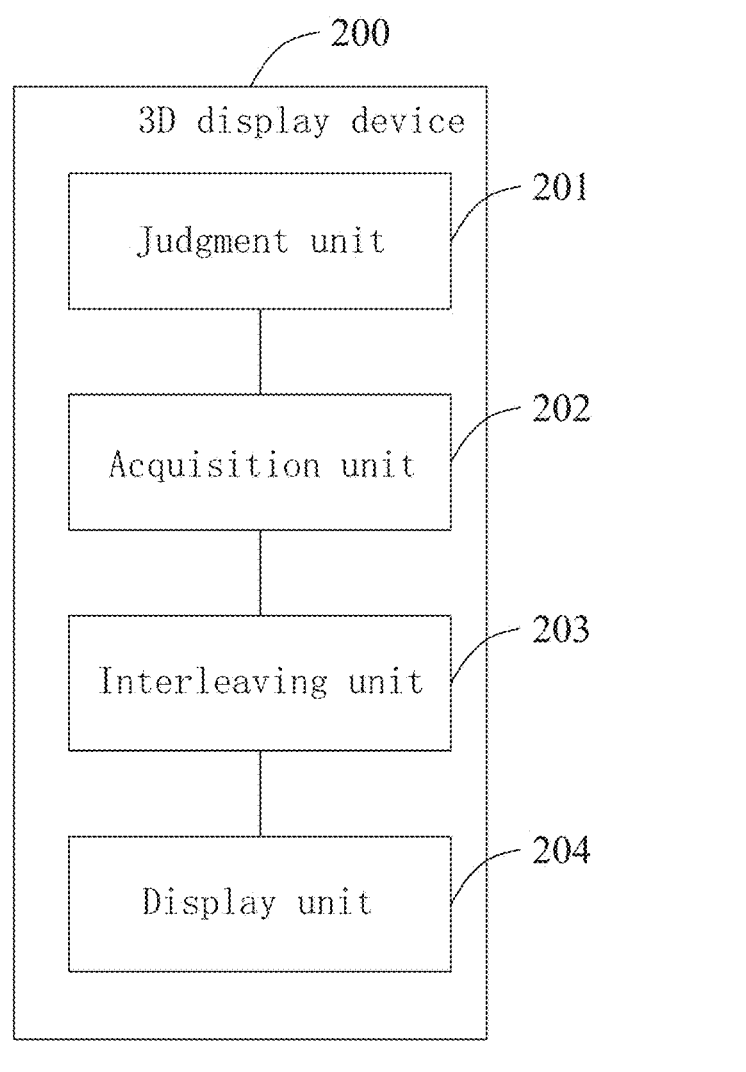

200

3D display device

Judgment unit — 201

Acquisition unit — 202

Interleaving unit — 203

Display unit — 204

FIG  6

3D DISPLAY METHOD AND 3D DISPLAY DEVICE

CROSS-REFERENCE TO RELATED APPLICATION

The present application is a continuation application of International Application No. PCT/CN2022/143110, filed on Dec. 29, 2022, which claims priority to Chinese Patent Application No. 202210491259.0, filed on May 7, 2022. The disclosures of the aforementioned applications are incorporated in the present application by reference in their entirety.

TECHNICAL FIELD

The present application relates to the technical field of naked-eye 3D displaying, and in particular to a 3D display method and a 3D display device.

BACKGROUND

Naked-eye 3D technology is implemented based on the parallax of the human eyes. That is, there is difference between images obtained by the left eye and the right eye when the two eyes observe the same target. The image obtained by the left eye and the image obtained by the right eye are synthesized in the brain, which results the 3D content we see. Thus, after being processed through the screen, the images with parallax are mapped to the left eye and the right eye of a man correspondingly, and the man will see a 3D image.

The 3D game engine generally encapsulates complex graphics algorithms inside a module and provide a simple and effective SDK interface to the outside.

However, at now there is no way to display the game through naked-eye 3D technology to achieve the naked-eye 3D display effect of the game.

SUMMARY

A first aspect of embodiments of the present application provides a 3D display method including:

in a condition that a display image corresponding to a current layer is to be rendered to a screen of a 3D display device, determining whether the current layer is marked to be in a 3D display mode;

in a condition that the current layer is marked to be in the 3D display mode, obtaining physical parameters of the 3D display device;

invoking an interleaving program to interleave the display image corresponding to the current layer according to the physical parameters of the 3D display device to obtain a 3D display image corresponding to the current layer; and rendering and displaying the 3D display image.

A second aspect of the embodiments of the present application provides a 3D display device including:

a memory configured to store program instructions, and at least one processor configured to invoke the program instructions from the memory to execute a 3D display method which includes:

judging whether a current layer is marked to be in a 3D display mode in a condition that a display image corresponding to the current layer is to be rendered to a screen of the 3D display device;

acquiring physical parameters of the 3D display device in a condition that the current layer is marked to be in the 3D display mode;

calling an interleaving program to interleave the display image corresponding to the current layer according to the physical parameters of the 3D display device to obtain a 3D display image corresponding to the current layer, the program being created through a rendering engine corresponding to the 3D display device; and rendering and displaying the 3D display image.

Compared with the related art, according to the embodiments provided by the present application, the display image corresponding to the current layer can be interleaved according to the physical parameters of the 3D display device through an additionally created interleaving program, and then rendered and displayed to perform 3D display.

BRIEF DESCRIPTION OF THE DRAWINGS

FIG. 1 is a schematic flowchart of a 3D display method according to an embodiment of the present application.

FIG. 3 is a schematic flowchart of implementing naked-eye 3D display with human eye tracking according to an embodiment of the present application.

FIG. 4 is a schematic flowchart of determining eye position data of a target user according to an embodiment of the present application.

FIG. 5 is a schematic flowchart of determining gyroscope data corresponding to a 3D display device according to an embodiment of the present application.

FIG. 6 is a schematic diagram showing a structure of a 3D display device according to an embodiment of the present application.

DETAILED DESCRIPTION OF THE EMBODIMENTS

In the following, the embodiments of the present application will be clearly and completely described with reference to the drawings in the embodiments of the present application. Obviously, the described embodiments are only some of the embodiments of the present application, and not all of the embodiments. Based on the embodiments of the present application, all other embodiments obtained by those of ordinary skilled in the art without creative efforts shall fall within the claimed scope of the present application.

The 3D display method according to the embodiments of the present application is described from the perspective of a 3D display device. Referring to FIG. 1. FIG. 1 is a schematic flowchart of the 3D display method according to an embodiment of the present application. The method includes the following operations.

In operation 101, in a condition that a display image corresponding to a current layer is to be rendered to a screen of the 3D display device, whether the current layer is marked to be in a 3D display mode is determined, and in a condition that the current layer is marked to be in the 3D display mode, operation 102 is performed.

In this embodiment, when the 3D display device is to render and display the display image corresponding to the current layer on the screen, whether a display mode of the current layer is marked to be in the 3D display mode can be determined. In a condition that the display mode of the current layer is marked to be in the 3D display mode, operation 102 is performed. In operation 105, in a condition that the display mode of the current layer is not marked to be in the 3D display mode, the current layer is rendered according to a general rendering method.

It should be noted that the 3D display device can designate a layer for an object to be displayed in advance. In an embodiment, referring also to FIG. 2, in operation 110, a display module corresponding to the 3D display device can be called to create the layer. The display module corresponding to the 3D display device is based on which system the 3D display device employs. For example, the display module in the Android system is SurfaceFlinger. Of course, another display module in another operating system can be employed, such as the display module in the IOS system. The following description is based on the Android system, which is taken as an example.

Figure 2:
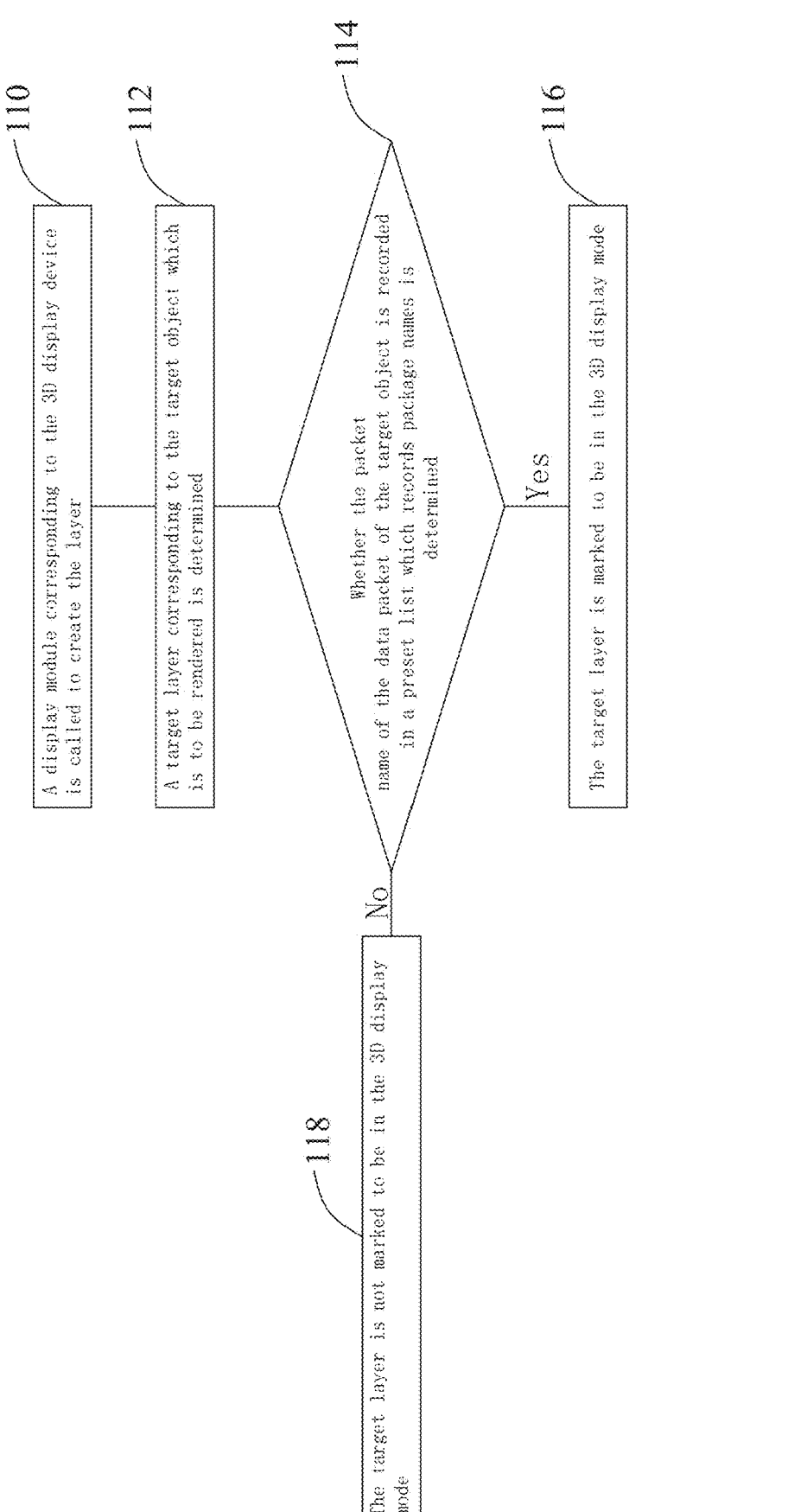
FIG. 2 is a schematic flowchart of creating a layer according to an embodiment of the present application.

When the 3D display device is to create the layer through the SurfaceFlinger display module, a package name of a data package corresponding to a target object is passed to SurfaceFlinger firstly (the target object can be a game or a video, and is not to be limited thereto). Referring also to FIG. 2, in operation 112, a target layer corresponding to the target object which is to be rendered is determined, and in operation 114, whether the packet name of the data packet of the target object is recorded in a preset list which records package names is determined (the preset list records package names of multiple objects including the target object, and the multiple objects in the preset list are those which need to be displayed in the 3D display mode). In operation 116, in a condition that the package name of the target object is recorded in the preset list, the target layer is marked to be in the 3D display mode, and in operation 118, in a condition that the package name of the target object is not recorded in the preset list, the target layer is not marked to be in the 3D display mode. Taking a game as an example, the SurfaceFlinger display module determines whether the game needs to be displayed in the 3D display mode based on the preset list. In a condition that a packet name of a data package of the game is stored in the preset list, it is determined that the game needs to to be displayed in the 3D display mode. That is, the game is finally shown with a 3D display effect. A target layer corresponding to the game is marked to be in the 3D display mode, and the SurfaceFlinger display module uses OpenGLES to perform window overlay processing on the target layer.

In operation 102, in a condition that the current layer is marked to be in the 3D display mode, physical parameters of the 3D display device are obtained.

In this embodiment, after the 3D display device determines that the current layer is marked to be in the 3D display mode, the 3D display device obtains the physical parameters of itself. The method of obtaining the physical parameters of the 3D display device is not limited here. For example, a prompt can be issued to prompt the user to input the physical parameters. Of course, the physical parameters can be obtained in other ways. The physical parameters refer to an fitting angle and a width of a grating corresponding to the 3D display device. Of course, the physical parameters can also include other parameters corresponding to the naked-eye 3D display, such as a viewpoint width of the grating and other parameters, which are not to be limited herein.

In operation 103, an interleaving program is invoked to interleave the display image corresponding to the current layer according to the physical parameters of the 3D display device to obtain a 3D display image corresponding to the current layer.

In this embodiment, when the SurfaceFlinger display module uses OpenGLES to merge layers, a default opengl program P1 is created in the rendering engine (RenderEngine) to render each layer to the screen corresponding to the 3D display device. In condition that the 3D display device determines that the current layer is marked to be in the 3D display mode, the 3D display device can call the interleaving program which is created by the rendering engine corresponding to the 3D display device to interleave the current layer according to the physical parameters of the 3D display device, and obtain the 3D image corresponding to the current layer.

It should be noted that when a layer marked to be in the 3D display mode is to be rendered for the first time, RenderEngine will create an additional interleaving program P2 to interleave the layer according to the physical parameters of the 3D display device, and then the layer is rendered to the screen. Understandably, the interleaving program only needs to be created at the first time for rendering, not at each time for rendering.

It should be noted that the time of carrying out operation 102 is not to be limited herein. The operation 102 can be carried out before operation 101, after operation 101, or the both can be carried out simultaneously. It only requires that the physical parameters of the device are obtained before that the interleaving program is called to interleaving the display image corresponding to the current layer.

In operation 104, the 3D display image is rendered and displayed.

In this embodiment, after the 3D display device interleaves the current layer according to the physical parameters of the 3D display device through the created interleaving program, the interleaved display image can be rendered and displayed on the screen of the 3D display device, and the 3D displaying of the target object is realized.

In one embodiment, referring to FIG. 3, the 3D display device can also implement the naked-eye 3D display with human eye tracking, which is detailed below.

In operation 120, current eye position data of a target user and current gyroscope data corresponding to the 3D display device are determined. The target user is the person currently viewing the screen of the 3D display device.

In operation 122, a final eye angle value corresponding to the target user based on the current eye position data of the target user and the current gyroscope data are determined.

In operation 124, the 3D display image displayed after rendering is adjusted according to the final eye angle value.

In this embodiment, when the target user is viewing the naked-eye 3D image displayed on the screen of the 3D display device, the eye position data of the target user and the gyroscope data corresponding to the 3D display device at the current moment can be determined. The eye position data of the target user include a viewing angle value and a viewing distance value.

Referring to FIG. 4, when to determine the current eye position data of the target user, in operation 130, the 3D display device obtains a face image of the target user through a camera, and determines a position of a left pupil $(x_1, y_1)$ and a position of a right pupil $(x_2, y_2)$ in the face image. In operation 132, the 3D display device calculates a horizontal viewing angle $\alpha=(x_2-x_1)*A$, and a vertical viewing angle $\beta=(y_2-y_1)*A$ according to a deviation of the left pupil and the right pupil from an origin of the image. A is a calibration constant of viewing angle. In operation 134, the 3D display device calculates the viewing angle value δ based on the horizontal viewing angle and the vertical viewing angle, and in operation 136, the 3D display device calculates the viewing distance value M=l*B/cosδ based on the viewing angle value δ and an interpupillary distance of the target user (the interpupillary distance of the target user can be calculated based on the positions of the left pupil and the right pupil of the target user's). B is a calibration constant of viewing distance, l represents the interpupillary distance of the left and right pupils. It can be understood that the deviation of the left and right pupils from the origin of the image refers to a deviation of a midpoint between the left and right pupils from the origin of the image.

Referring to FIG. 5, when to determine the gyroscope data corresponding to the 3D display device, in operation 140, the 3D display device obtains a stored first pitch angle value V1 of a gyroscope (the 3D display device updates the stored pitch angle value of the gyroscope when the pitch angle value is changed. The first pitch angle value V1 refers the last updated pitch angle value of the gyroscope). In operation 142, the 3D display device monitors a refresh command, and calculates a second pitch angle value V2 of the gyroscope in responding to that the screen of the 3D display device is refreshed according to the refresh command. Finally, in operation 144, the pitch angle change value of the gyroscope (that is, the gyroscope data) is obtained based on the first pitch angle value V1 and the second pitch angle value V2.

It should be noted that the pitch angle value can be marked by a three-dimensional standard coordinate system, and the three-dimensional spatial coordinates can intuitively reflect the angular relationship between the human eye and the 3D display device. The gyroscope can output posture information of the 3D display device at high frequency in a short period of time, based on this, the gyroscope can be employed to calculate the pitch angle change value of the gyroscope between two successive times of detecting human eye to instantly output the pitch (i.e., posture information) of the 3D display device, thus to makes up for the blank time between frames of the camera.

After the eye position data of the target user and the gyroscope data are determined, the final eye angle value corresponding to the target user can be determined according to the eye position data and the gyroscope data, that is, the initial eye position data adds the pitch angle change value to obtain the final eye angle value, so that the 3D display device can adjust the 3D display image through the stereoscopic game engine based on the eye angle value. The angle value between the target user's eyes and the screen of the 3D display device is V0, and V0 represents an angular relationship between the target user's eyes and the screen of the 3D display device at the current time in the three-dimensional standard coordinate system. The final eye angle value is Vx, and the calculation formula is: Vx=V0+Vp. By adding the pitch angle change value Vp of the gyroscope to the initial eye position data, an accurate and reliable final eye angle value can be obtained.

Finally, the 3D display image displayed after rendering is adjusted according to the final eye angle value. The 3D display image can be observed even when the target user moves or the 3D display device moves. In the embodiment, the 3D display device rotates or moves the 3D display image according to the final eye angle value. An rotated angle of the 3D display image is in a direction opposite to a changed angle of the position of the human eye, and the two has a linear relationship. A ratio of the linear relationship is calculated according to the distance from the human eye to the screen to the distance between the human eye and the 3D display image and the actual depth of field of the scene which are multiplied by an adjustment parameters, thus to give the user a more realistic 3D virtual scene experience.

It is understandable that when a user plays a naked-eye 3D game on the 3D display device, he or she would touch the screen, which will inevitably cause the device to shake slightly. In the present application, the gyroscope 13 is employed to assist in capturing the position of the human eye. Even during shaking, the gyroscope can transmit the pitch angle change value of the device in real time and detect the human eye in real time, so that the user can always view the 3D display image.

In summary, it can be seen that in the embodiments provided by the present application, the display image corresponding to the current layer can be interleaved according to the physical parameters of the 3D display device through a created interleaving program, and then rendered and displayed.

Some embodiments of the present application are described above from the perspective of the 3D display method, and some other embodiments of the present application are described below from the perspective of the 3D display device.

Please refer to FIG. 6. FIG. 6 is a schematic diagram of a virtual structure of the 3D display device provided by an embodiment of the present application. The 3D display device 200 includes:

a judgment unit 201 configured to judge whether a current layer is marked to be in a 3D display mode in a condition that a display image corresponding to the current layer is to be rendered to a screen of the 3D display device;

an acquisition unit 202 configured to acquire physical parameters of the 3D display device in a condition that the current layer is marked to be in the 3D display mode;

an interleaving unit 203 configured to call an interleaving program to interleave the display image corresponding to the current layer according to the physical parameters of the 3D display device to obtain a 3D display image corresponding to the current layer, the program being created through a rendering engine corresponding to the 3D display device; and a display unit 204 configured to render and display the 3D display image.

In a possible embodiment, the interleaving unit 203 is further configured to:

call a display module corresponding to the 3D display device to create a layer;

determine a target layer corresponding to a target object which is to be rendered;

determine whether a package name of a data package of the target object is recorded in a preset list;

in a condition that the package name of the target object is recorded in the preset list, mark the target layer to be in the 3D display mode.

In a possible embodiment, the interleaving unit 203 is further configured to:

determine current eye position data of a target user and current gyroscope data corresponding to the 3D display device, the target user being a people currently viewing the screen of the 3D display device;

determine a final eye angle value corresponding to the target user based on the current eye position data of the target user and the current gyroscope data;

adjust the 3D display image which is displayed after rendering according to the final eye angle value.

In a possible embodiment, the current eye position data of the target user includes an viewing angle value and a viewing distance value. The interleaving unit 203 determining the current eye position data of the target user includes:

determine a current position of a left pupil and a current position of a right pupil of the target user in a face image;

determine a horizontal viewing angle and a vertical viewing angle according to a deviation of the left pupil and the right pupil from an origin of the face image, the current position of the left pupil and the current position of the right pupil;

determine the viewing angle value according to the horizontal viewing angle and the longitudinal viewing angle;

calculate the viewing distance value based on the viewing angle value and an interpupillary distance of the target user.

In a possible embodiment, the interleaving unit 203 determining the current gyroscope data corresponding to the 3D display device includes:

obtain a stored first pitch angle value of a gyroscope;

determine a second pitch angle value of the gyroscope in responding to that a refresh command corresponding to the 3D display device is issued;

determine the current gyroscope data corresponding to the 3D display device according to the first pitch angle value and the second pitch angle value.

Figure 7:
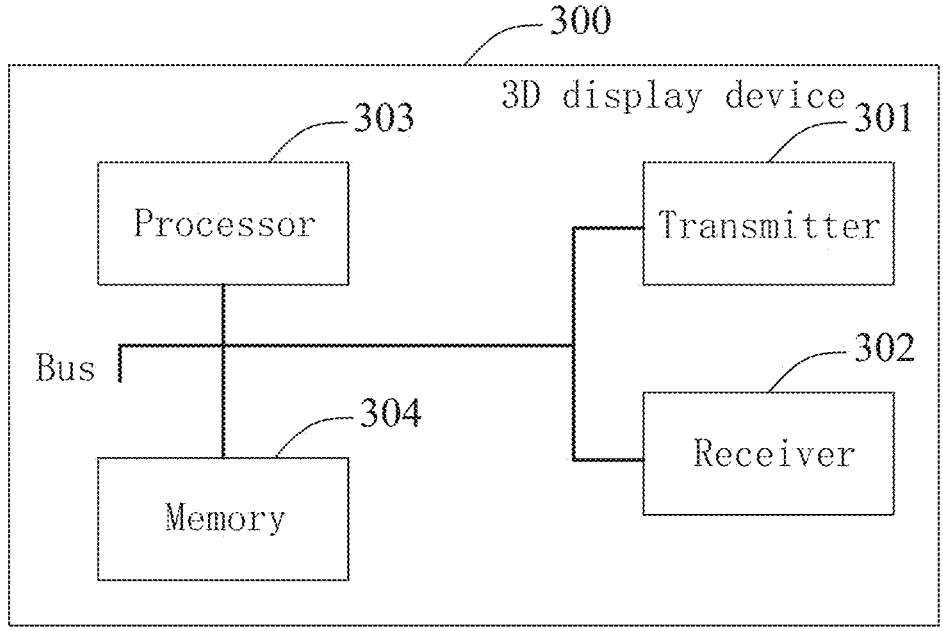
FIG. 7 is a schematic diagram of hardware structures of the 3D display device according to an embodiment of the present application.

In the following, another 3D display device provided by an embodiment of the present application is introduced. Referring to FIG. 7, FIG. 7 is a schematic diagram of a hardware structure of the 3D display device according to the embodiment of the present application. The 3D display device 3 includes a receiver 301, a transmitter 302, a processor 303 and a memory 304 (the number of processors 303 in the 3D display device 300 may be one or more, one processor is taken as an example and shown in FIG. 7).

In some embodiments of the present application, the receiver 301, the transmitter 302, the processor 303 and the memory 304 may be connected through a bus or other means, and the bus is taken as an example and shown in FIG. 7.

The memory 304 may be a read-only memory or a random access memory. The memory 304 provides instructions and data to the processor 303. Portion of the memory 304 may be an NVRAM. The memory 304 stores an operating system, operating instructions, executable modules, data structures, subsets thereof, or extended sets thereof. The operating instructions may include various operating instructions for implementing various operations. The operating system may include various system programs that are employed to implement various basic services and handle hardware-based tasks.

The processor 303 controls the operation of the 3D display device, and the processor 303 may also be called as "CPU". In an applications, various components of the 3D display device are connected through a bus system. In addition to a data bus, the bus system may also include a power bus, a control bus, a status signal bus, etc. However, for the sake of clarity, various buses are all represented by the bus system in the FIGS.

The 3D display method disclosed by the above embodiments of the present application can be applied to the processor 303 or implemented by the processor 303. The processor 303 may be an integrated circuit chip with signal processing capabilities. During the implementation process, each operation of the method shown in FIG. 1 can be realized by software instructions or by hardware integrated logic circuits in the processor 303. The above-mentioned processor 303 may be a general-purpose processor, a DSP, an ASIC, a FPGA or another programmable logic device, a discrete gate, a transistor logic device, or a discrete hardware component which can carry out each method, each operation and each logical block diagram disclosed in the embodiments of the present application. A general-purpose processor may be a microprocessor or any conventional processor, etc. The operations of the method disclosed in the embodiments of the present application can be directly implemented by a hardware decoding processor, or executed by a combination of hardware modules and software modules in the decoding processor. The software module can be stored in a mature storage medium in this field, such as in a random access memory, a flash memory, a read-only memory, a programmable read-only memory or an electrically erasable programmable memory, or a register. The storage medium is installed in the memory 304. The processor 303 reads the data from the memory 304 and carries out the operations of the above method in combination with the hardware of the processor.

Embodiments of the present application also provide a computer-readable medium that stores computer-executable instructions. The computer-executable instructions enable a processor to execute the 3D display method described in the above embodiments. The implementation principles and technical effects are similar to that described in the above and will not be repeated here.

In addition, it should be noted that the device embodiments described above are only illustrative. The units described as separate components may or may not be physically separated, and the components shown as units may or may not be physically separated. The physical units can be located in the same place, or they can be distributed to multiple network units. Some or all of the modules can be selected and employed according to actual needs to achieve the purpose of those embodiments. In addition, in the drawings of the device embodiments provided in the present application, the connection relationship between modules indicates that there are communication connections between them, which can be one or more communication buses or signal lines.

From the above description of the embodiments, it will be clear to those skilled in the art that the above embodiments of the present application can be implemented by means of software plus the necessary common hardware platform. Of course, they can also be implemented by dedicated hardware including dedicated integrated circuits, dedicated CPUs, dedicated memories, and dedicated components. In general, functions performed by computer programs can be easily realized with corresponding hardware. Moreover, the specific hardware structures used to implement the same function can be various, such as analog circuits, digital circuits or dedicated circuits, etc. However, software program is preferred for the implementation of the present application in most cases. Based on this understanding, the technical solutions of the present application can be embodied in the form of software products in essence or the part that contributes to the prior art. The computer software product is stored in a readable storage medium, such as a computer floppy disk, a U disk, a mobile hard disk, a read-only memory (ROM), a random access memory (RAM), a magnetic disk or an optical disk, etc., and includes several instructions to make a computer device (which can be a personal computer, a server, or a network device, etc.) execute the methods described in various embodiments of the present application.

The above-described embodiments may be implemented in whole or in part by software, hardware, firmware or any combination thereof. When being implemented in software, it can be implemented in whole or in part in the form of a computer program product.

The computer program product includes one or more computer program instructions. When the computer program instructions are loaded on and executed by a computer, the flows or functions according to embodiments of the present application is generated in whole or in part. The computer may be a general purpose computer, a special purpose computer, a computer network, or another programmable device. The computer instructions can be stored in a computer-readable storage medium, or be transferred from one computer-readable storage medium to another. For example, computer instructions may be transmitted from one Web site, computer, server, or data center to another Web site, computer, server, or data center with a wired (e.g. a coaxial cable, an optical fiber, a digital subscriber line (DSL)) or wireless (e.g. infrared, wireless, microwave, etc.) way. The computer-readable storage medium may be any available medium that a computer can access or a data storage device such as a server, a data center, etc. containing one or more available medium. The available medium may be a magnetic medium (e.g. a floppy disk, a storage disk, a magnetic tape), an optical medium (e.g. a DVD), or a semiconductor medium (e.g. a Solid State Disks (SSD)), etc.

Finally, it should be noted that the above embodiments are only used to illustrate the technical solutions of the present application, and are not intended to limit the technical solutions. Although the present application has been described in detail with reference to the foregoing embodiments, those of ordinary skill in the art should understand that the technical solutions described in the foregoing embodiments can be modified, or some or all of the technical features can be equivalently replaced. Those modifications and replacement do not make the technical solutions deviate from the essence of the present application and should fall within the claimed scope of the present application.

What is claimed is:

1. A 3D display method, comprising:
in a condition that a display image corresponding to a current layer is to be rendered to a screen of a 3D display device, determining whether the current layer is marked to be in a 3D display mode;
in a condition that the current layer is marked to be in the 3D display mode, obtaining physical parameters of the 3D display device;
invoking an interleaving program to interleave the display image corresponding to the current layer according to the physical parameters of the 3D display device to obtain a 3D display image corresponding to the current layer;
rendering and displaying the 3D display image;
calling a display module corresponding to the 3D display device to create a layer;
determining a target layer corresponding to a target object which is to be rendered;
determining whether a package name of a data package of the target object is recorded in a preset list;
in a condition that the package name of the target object is recorded in the preset list, marking the target layer to be in the 3D display mode;

determining current eye position data of a target user and current gyroscope data corresponding to the 3D display device, the target user being a people currently viewing the screen of the 3D display device;
determining a final eye angle value corresponding to the target user based on the current eye position data of the target user and the current gyroscope data; and
adjusting the 3D display image which is displayed after rendering according to the final eye angle value.

2. The method of claim 1, wherein the current eye position data of the target user comprises an viewing angle value and a viewing distance value, the determining the current eye position data of the target user comprises:
determining a current position of a left pupil and a current position of a right pupil of the target user in a face image;
determining a horizontal viewing angle and a vertical viewing angle according to a deviation of the left pupil and the right pupil from an origin of the face image, the current position of the left pupil and the current position of the right pupil;
determining the viewing angle value according to the horizontal viewing angle and the longitudinal viewing angle; and
calculating the viewing distance value based on the viewing angle value and an interpupillary distance of the target user.

3. The method of claim 1, wherein the determining the current gyroscope data corresponding to the 3D display device comprises:
obtaining a stored first pitch angle value of a gyroscope;
determining a second pitch angle value of the gyroscope in responding to that a refresh command corresponding to the 3D display device is issued; and
determining the current gyroscope data corresponding to the 3D display device according to the first pitch angle value and the second pitch angle value.

4. A 3D display device, comprising:
a memory configured to store program instructions, and
at least one processor configured to invoke the program instructions from the memory to execute a 3D display method which comprises:
judging whether a current layer is marked to be in a 3D display mode in a condition that a display image corresponding to the current layer is to be rendered to a screen of the 3D display device;
acquiring physical parameters of the 3D display device in a condition that the current layer is marked to be in the 3D display mode;
calling an interleaving program to interleave the display image corresponding to the current layer according to the physical parameters of the 3D display device to obtain a 3D display image corresponding to the current layer, the program being created through a rendering engine corresponding to the 3D display device;
rendering and displaying the 3D display image;
calling a display module corresponding to the 3D display device to create a layer;
determining a target layer corresponding to a target object which is to be rendered;
determining whether a package name of a data package of the target object is recorded in a preset list; and
in a condition that the package name of the target object is recorded in the preset list, marking the target layer to be in the 3D display mode;
determining current eye position data of a target user and current gyroscope data corresponding to the 3D display device, the target user being a people currently viewing the screen of the 3D display device;

determining a final eye angle value corresponding to the target user based on the current eye position data of the target user and the current gyroscope data; and adjusting the 3D display image which is displayed after rendering according to the final eye angle value.

5. The 3D display device of claim 4, wherein the current eye position data of the target user includes an viewing angle value and a viewing distance value, the 3D display method further comprises:

determining a current position of a left pupil and a current position of a right pupil of the target user in a face image;

determining a horizontal viewing angle and a vertical viewing angle according to a deviation of the left pupil and the right pupil from an origin of the face image, the current position of the left pupil and the current position of the right pupil;

determining the viewing angle value according to the horizontal viewing angle and the longitudinal viewing angle; and calculating the viewing distance value based on the viewing angle value and an interpupillary distance of the target user.

6. The 3D display device of claim 5, wherein the 3D display method further comprises:

obtaining a stored first pitch angle value of a gyroscope;

determining a second pitch angle value of the gyroscope in responding to that a refresh command corresponding to the 3D display device is issued; and determining the current gyroscope data corresponding to the 3D display device according to the first pitch angle value and the second pitch angle value.

* * * * *